(12) United States Patent
Bahrs et al.

(10) Patent No.: US 7,134,076 B2
(45) Date of Patent: Nov. 7, 2006

(54) METHOD AND APPARATUS FOR PORTABLE UNIVERSAL RESOURCE LOCATOR AND CODING ACROSS RUNTIME ENVIRONMENTS

(75) Inventors: Peter Bahrs, Austin, TX (US); Brian Thomas Lillie, Austin, TX (US); Isabel Berdeen Van Horn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 09/970,865

(22) Filed: Oct. 4, 2001

(65) Prior Publication Data

US 2004/0205557 A1 Oct. 14, 2004

(51) Int. Cl.
*G06F 7/00* (2006.01)
(52) U.S. Cl. .................................... 715/513
(58) Field of Classification Search ............. 715/501.1, 715/513
See application file for complete search history.

(56) References Cited

U.S. PATENT DOCUMENTS

| | | | |
|---|---|---|---|
| 5,999,914 A | * | 12/1999 | Blinn et al. .............. 705/26 |
| 6,268,856 B1 | * | 7/2001 | Bruck et al. ............. 345/733 |
| 2004/0111381 A1 | * | 6/2004 | Messer et al. ............ 705/78 |

OTHER PUBLICATIONS

Benson et al, Multimedia Data Management for Process Control, IEEE, 1994, pp. 332-341.*

* cited by examiner

*Primary Examiner*—C. B. Paula
(74) *Attorney, Agent, or Firm*—Duke W. Yee; Mark S. Walker; Theodore D. Fay III (57) ABSTRACT

A method, apparatus, and computer instructions in a data processing system for generating links. The present invention provides a mechanism for constructing a link in a manner that removes the need to rely on hard-coded strings. Generation of a page containing a link to a target is detected. A link is generated using parameters associated with the target.

32 Claims, 5 Drawing Sheets

```
1100 {
    <?xml version="1.0" encoding="UTF-8"?>
    <vendor>
        <url name="InteliData">
            <resource>http://test.secureofx.bankhost.com/usaa/web.forte</resource>
        </url>
    </vendor>
}
```

500 — StringaUrl = URLConstructor.construct (host, type, target, file, parms);

FIG. 6

- 600 — RECEIVE CALL FROM CALLER TO CONSTRUCT URL
- 602 — IDENTIFY HOST NAME AND PORT USING HOST PARAMETER
- 604 — IDENTIFY PROTOCOL AND RESOURCE INFORMATION USING TARGET PARAMETER
- 606 — BUILD URL
- 608 — RETURN URL TO CALLER

```
<static_content_aliases>
    <type name="DocumentRoot">Document_Root_Name</type>       — 702
    <type name="ResourceType1">Resource_Directory_Name</type>
    <type name="ResourceTypeN">Resource_Directory_Name</type>
</static_content_aliases>
```
700

*FIG. 7*

```
<dynamic_content_aliases>
    <alias name="ApplicationName1">   — 802
        <url>
            <protocol>scheme_name</protocol>   — 806
            <secure>true</secure>
            <resource> PathName/ServletName</resource>  — 810
        <url>                                        \
    </alias>                                         808
    <alias name="ApplicationNameN">
        <url>
            <protocol>scheme_name</protocol>
            <secure>true</secure>
            <resource> PathName/ServletName</resource>
        <url>
    </alias>
</dynamic_content_aliases>
```
800, 804

*FIG. 8*

```
<asp_paths>
    <asp name="ApplicationName1">   — 902
        <resource> path_details/asp_filename</resource>  — 904
    </asp>
    <asp name="ApplicationNameN">
        <resource> path_details/asp_filename</resource>
    </asp>
</asp_paths>
```
900

*FIG. 9*

```
<host_aliases>
        <default_host name="default_host_machine_name">
                <alias>default_host_machine_alias</alias>
        </default_host>
        <host name="machine1_name">
                <alias>machine1_alias</alias>
        </host>
        <host name="machineN_name">
                <alias>machineN_alias</alias>
        </host>
</host_aliases>
```

FIG. 10

```
<?xml version="1.0" encoding="UTF-8"?>
<vendor>
        <url name="InteliData">
                <resource>http://test.secureofx.bankhost.com/usaa/web.forte</resource>
        </url>
</vendor>
```

FIG. 11

METHOD AND APPARATUS FOR PORTABLE UNIVERSAL RESOURCE LOCATOR AND CODING ACROSS RUNTIME ENVIRONMENTS

BACKGROUND OF THE INVENTION

1. Technical Field

The present invention relates generally to an improved data processing system, and in particular, to a method and apparatus for generating links to resources. Still more particularly, the present invention provides a method, apparatus, and computer instructions for generating links to resources that may be used across different runtime environments.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

Web pages requested by users may be static or dynamic. With respect to dynamic Web pages, code, such as a Java server page is used to generate this type of dynamic content. In designing dynamic content, embedded links, such as URLs, should be avoided. The reason for this avoidance is that hard-coded strings for links cause additional maintenance. This maintenance occurs because files containing hard-coded strings for links will need to be modified any time a component of the URL changes. Additionally, the use of a hard-coded string also is a problem when content is moved from development, to test and on to production. For example, http://development.internal.company.com/Accounts is used in development but may be changed to https://testing.internal.company.com/Accounts in testing and further changed to https://www.company.com/Banking/Accounts in production. Currently, when a change in the location of the content occurs, the programmer or developer is required to change each of the URL strings to reflect the current location of the content. Similar changes must be made if the name of the content changes. In some cases, a Web site may contain hundreds or thousands of links, all of which require changes when the Web site is moved. These changes are tedious and time consuming and may be prone to errors.

Therefore, it would be advantageous to have an improved method, apparatus, and computer instructions for generating links that do not rely on hard-coded strings.

SUMMARY OF THE INVENTION

The present invention provides a method, apparatus, and computer instructions in a data processing system for generating links. The present invention provides a mechanism for constructing a link in a manner that removes the need to rely on hard-coded strings. Generation of a page containing a link to a target is detected. A link is generated using parameters associated with the target.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
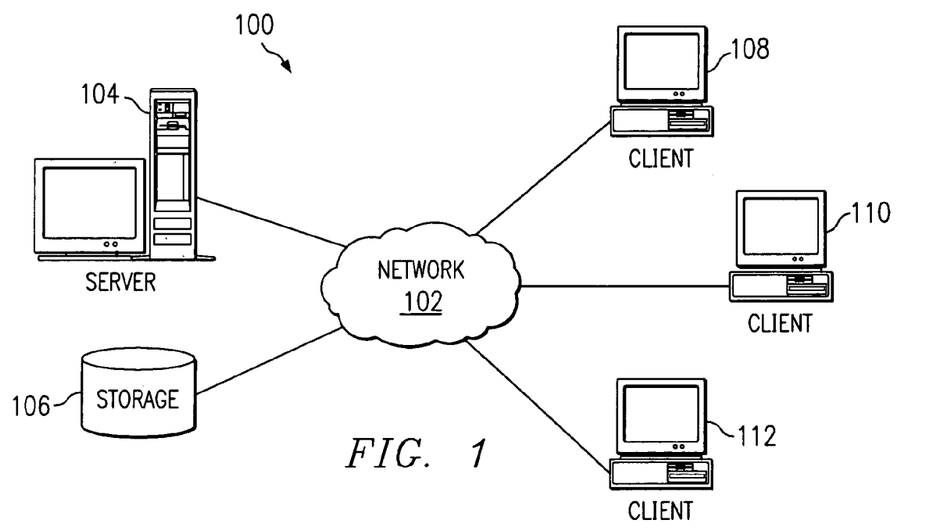
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

The mechanism of the present invention may be implemented in any of the clients or in the server illustrated in network data processing system 100. The mechanism of the present invention allows for resources, such as a Java server page, servlet, or other code referencing a link, such as a URL, to avoid hard-coded strings for referencing the link. A servlet is a Java application that runs in a Web server or application server and provides server-side processing, typically to access a database or perform e-commerce processing. Thus, if a resource is moved from one client to another, from one server to another server, or from a client to a server, the link does not have to be modified.

For example, a user may develop a Java server page (JSP) on client 108 and then move the final version of the JSP to server 104. A Java server page is an extension to the Java servlet technology that provides a simple programming vehicle for displaying dynamic content on a Web page. The JSP is an HTML page with embedded Java source code that is executed in the Web server or application server. The HTML provides the page layout that will be returned to the Web browser, and the Java provides the processing; for example, to deliver a query to the database and fill in the blank fields with the results.

These types of changes do not require the developer to change and verify all of the links for the JSP. In these examples, the link is dynamically constructed at runtime based on a set of input parameters as will be discussed in more detail below. This type of feature is especially advantageous when a developer works on a set of Web pages, which may include hundreds or thousands of links.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
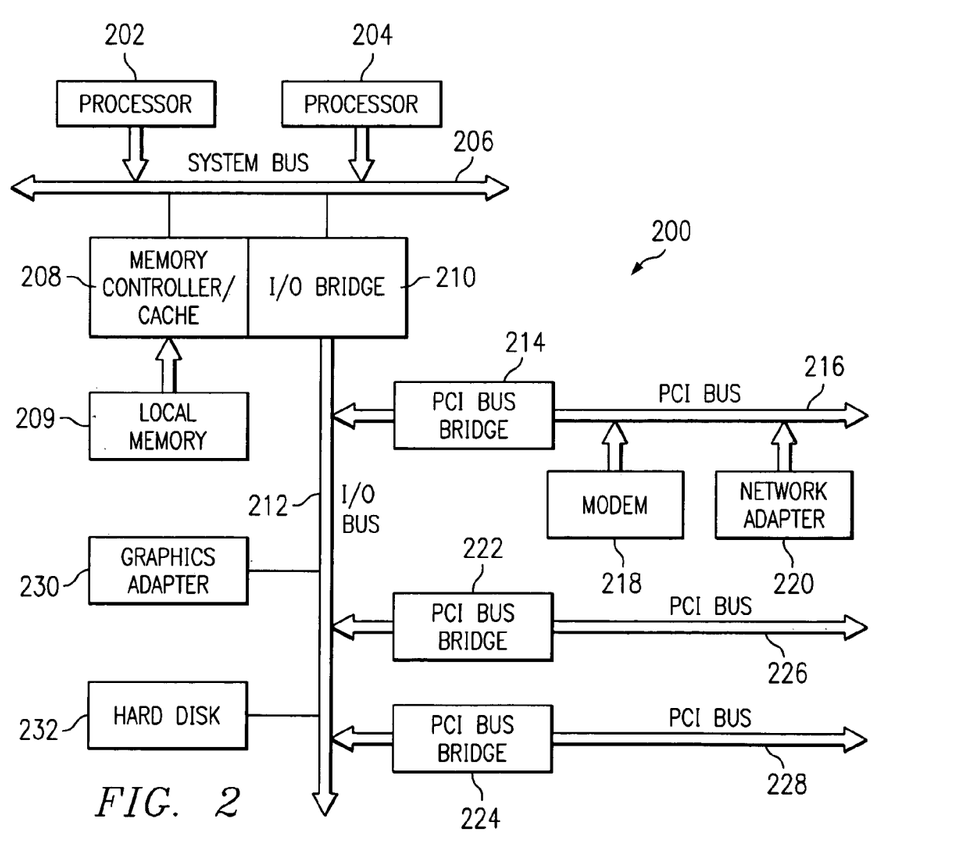
FIG. 2 is a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
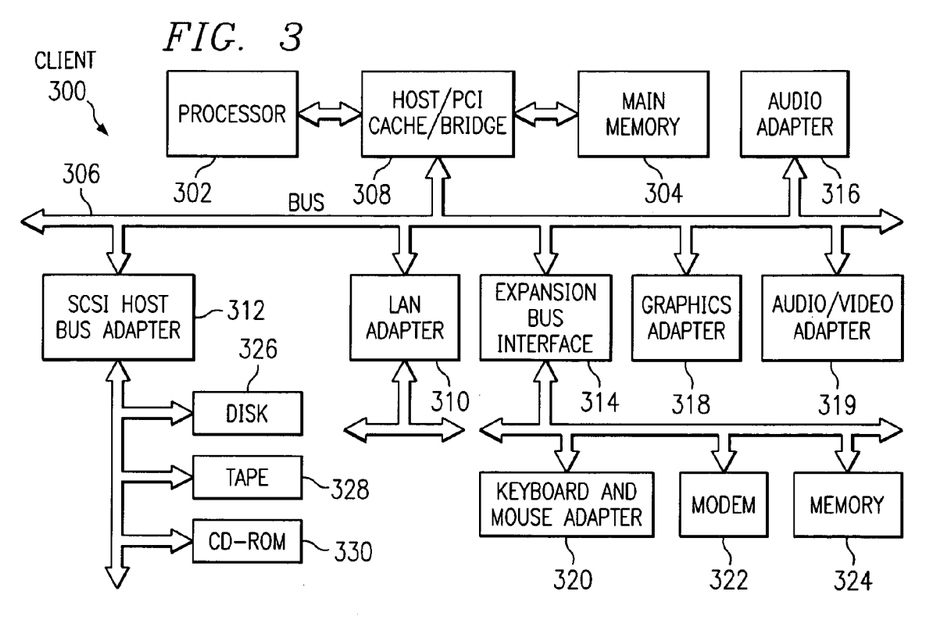
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. The present invention provides a method, apparatus, and computer instructions for encoding links, which are useable across different runtime environments.

The present invention recognizes that a URL for a dynamically generated Web page in a servlet or JSP includes a protocol, a host name, a path, a servlet alias, and any other applicable parameters. A URL for static content includes a protocol, a document route, a content directory, an optional subdirectory, and a file name. A URL for an active server page (ASP) includes a protocol, a host name, a path, an ASP file name, and any applicable parameters. An ASP is a Web server technology available from Microsoft Corporation that allows for the creation of dynamic interaction sessions with the user. More particularly, an ASP is a Web page that contains HTML and embedded programming code. The mechanism of the present invention provides an application programming interface for URL construction in these examples.

Figure 4:
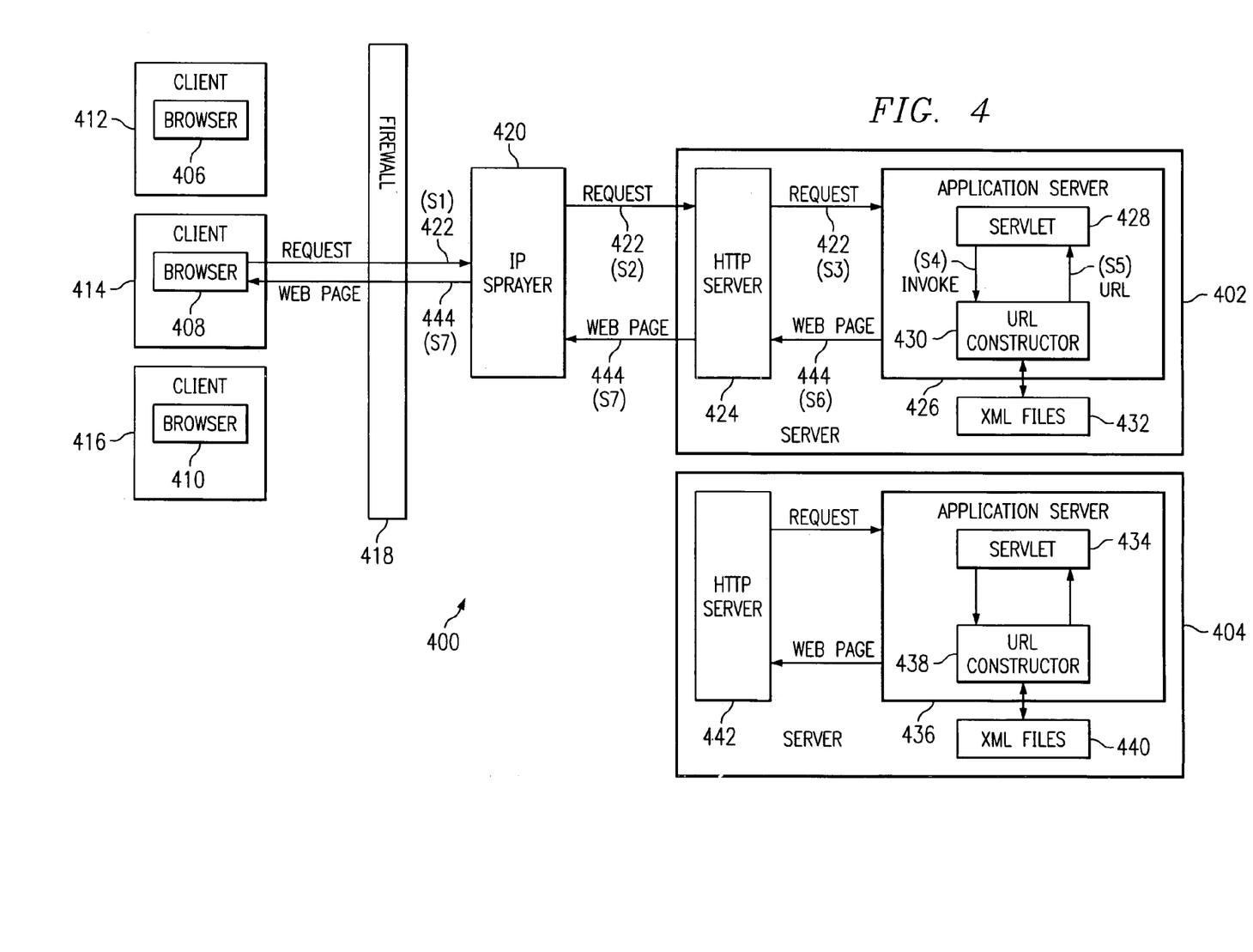
FIG. 4 is a diagram illustrating data flow in generating links in accordance with a preferred embodiment of the present invention.

With reference now to FIG. 4, a diagram illustrating data flow in generating links is depicted in accordance with a preferred embodiment of the present invention. Network data processing system 400 illustrates functional components used to generate URLs in different runtime environments. In this example, network data processing system 400 includes a server 402 and a server 404, which may receive requests from browser 406, browser 408, or browser 410. These browsers are located in clients 412, 414, and 416 in these examples.

The servers are separated from the clients by firewall 418. Requests received across firewall 418 are sent to the appropriate server using IP sprayer 420, which performs load balancing. The IP Sprayer in FIG. 4 balances incoming requests between HTTP servers 424 and 442. If one of the servers is taken out of service the other server will continue to serve all incoming requests.

In this example, the data flow begins by the user initiating a request 422 at browser 408, which is sent to IP sprayer 420 (step S1). Request 422 is sent from IP sprayer 420 to HTTP server 424 in server 402 (step S2). In the case of a request for static content, HTTP server 424 may locate and return that content to browser 408. With respect to a request for dynamic content, those requests are forwarded to application server 426 for processing (step S3).

In this example, application server 426 includes servlet 428 and URL constructor 430. Extensible markup language (XML) files 432 is accessed by URL constructor 430. XML is an open standard for describing data. XML uses tags to describe data elements within a file or stream. XML is often used for defining data elements in Web pages, business-to-business documents, or self-contained files. XML tags are defined by the developer or the business application. As such, XML tags can describe virtually any data item, such as product, sales rep, and amount due. HTML uses a similar tag structure as XML. HTML is used primarily for describing the data and its layout on Web pages. HTML requires that a certain set of tags be used. Well-formed HTML is equivalent to XML.

Servlet 428, may be, for example, a JSP. Servlet 428 dynamically generates a Web page based on a request. The URLs for this Web page may be generated by URL constructor 430 in response to an indication of URL constructor 430 by servlet 428 (step S4). In response, URL constructor 430 generates and returns a URL to servlet 428 (step S5). The generation of the URL may be performed using data or other imprinting information located in a data structure, such as XML files 432. This URL returned by URL constructor 430 may be used to redirect control to another JSP or servlet, such as servlet 434 in application server 436, located in server 404. Application server 436 also includes URL constructor 438. XML files 440 are located within server 404 for use by URL constructor 438. This redirection may be handled by HTTP server 442 in server 404. Alternatively, the URL returned by URL constructor 430 to servlet 428 may be used to construct links on a Web page that is to be returned in response to request 422.

In this example, servlet 428 generates Web page 444, which is sent to HTTP server 424 (step S6). In turn, HTTP server 424 sends Web page 444 to IP sprayer 420 (step S7). IP sprayer 420 returns Web page 444 to Web browser 408 in client 414 for display (step S7).

The actual links specified for the Web page in servlet 428 are not hard-coded in these examples. Instead, these links may contain a call or a base link, which is abstracted in a fashion that allows URL constructor 430 to dynamically build the URL string based on a set of input parameters located in the call or base link. The specifics of this type of call are described in more detail in FIG. 5 below.

The architecture and arrangement of components illustrated in FIG. 4 are meant as exemplary implementations of the present invention and not as architectural limitations to the present invention. For example, XML files 432 may be located in another server other than server 402. URL constructor 430 may be implemented as a separate application depending on the particular implementation.

Figure 5:
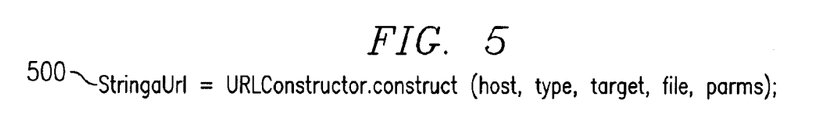
FIG. 5 is a diagram illustrating an application programming interface (API) call in accordance with a preferred embodiment of the present invention.

Turning now to FIG. 5, a diagram illustrating an application programming interface (API) call is depicted in accordance with a preferred embodiment of the present invention. Call 500 is an example of an API call which may be made to URL constructor 430 by servlet 428. This call may be made in response to encountering a base URL containing parameters that are used to generate the URL that is to be returned in the Web page or used to redirect the process to another servlet or JSP. The base URL may be, for example, http://servername.com/path/resource. The base URL includes, in these examples, the following: host, type, target, file, and parameters. The host is a host name (i.e. web.com). The type is a resource type name, which is, for example, either a Java type, ASP type, external type or file type. The target is a dynamic content application name for Java type, ASP type, external type or optional static content subdirectory name for file type. The file is the file name if the resource is of file type, static content. The parameters are any optional parameters required in the URL supplied with the input parameters that URL constructor 430, may use to build the URL. In addition to the parameters supplied by the caller, the URL constructor 430 requires information located in XML configuration files, such as XML files 432, to provide information.

In this example, the hostname may be obtained from an EnvironmentProfile or a HTTPServletRequest. A default hostname is also provided. For example: String host=anEnvironmentProfile.getHostName( ); or String host request.getServerName( );.

Referring back to FIG. 4, in this example, API call 500 may take the following form: URLConstructor.construct (host, type, target, file, params). In this example it is URLConstructor.construct(beta.company.com, servlet, BKMainMenu, null, null). The processing in URL constructor 430 will take the path for type, which is a servlet in this example. URL constructor 430 then looks up the passed parameters in host (beta.company.com) in HostAliases.xml looking for a match on the name attribute of the host elements in the file. This search is made using XML files 432. When a match is found the alias element is retrieved. This alias element contains the host name to use and a port number if any. If no match is found, the alias attribute of the default host element is retrieved. In this example, the alias for beta.company.com found in XML files 432 is beta.company.com:8080.

The target parameter is used as a lookup to retrieve protocol and resource information. URL constructor 430 looks for a match of target, BkMainMenu, in the name attribute of the alias element. When a match is found, the protocol and resource elements are retrieved from the URL element contained in the alias element with matching name. In this example, the protocol retrieved for BkMainMenu is HTTP and the resource is gas_bank/BkMainMenu.

Next, the protocol plus "://" plus the hostname plus "/" plus resource are appended together in a string buffer. If any query parameters are passed in on the params parameter, a "?" is appended to the string buffer followed by the passed parameters in a params string. The string buffer is then converted to a string and returned to the calling servlet 428. In the depicted example, the returned string is http://beta.company.com:8080/gas_bank/BkMainMenu.

Figure 6:
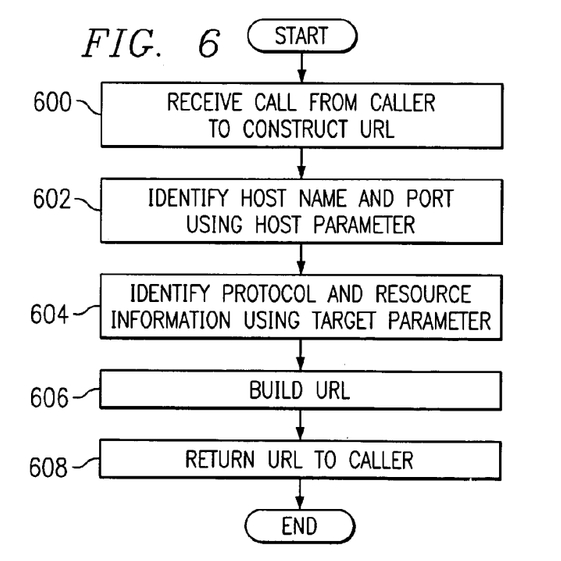
FIG. 6 is a flowchart of a process for creating a URL in accordance with a preferred embodiment of the present invention.

With reference next to FIG. 6, a flowchart of a process for creating a URL is depicted in accordance with a preferred embodiment of the present invention. The process illustrated in FIG. 6 may be implemented using a URL constructor, such as URL constructor 430 in FIG. 4.

The process begins by receiving a call from a caller to construct a URL (step 600). In these examples, this call may take the form of API call 500 in FIG. 5. A host name and port are identified using host parameter (step 602). Protocol and resource information are identified using target parameter (step 604). Next, a URL is built (step 606). The URL is built based on information identified from the parameters passed in the call. The URL is returned to the caller (step 608) with the process terminating thereafter.

In these examples, XML files 432 in FIG. 4 contains five XML files, which are used for configuration, static content aliases XML file (StaticContentAliases.xml), dynamic content aliases XML file (DynamicContentAliases.xml), ASP AspPaths.xml, ExternalPaths.xml and HostAliases.xml. In particular, StaticContentAliases.xml defines the resource document root name and the resource directory names based on type. StaticContentAliases is referenced for file types only. DynamicContentAliases.xml defines the protocol and the path and Java resources associated with the application. Lookup reference in DynamicContentAliases.xml starts with the application name. AspPaths.xml identifies the path and ASP file name associated with a given application. AspPaths is referenced for ASP types only. StaticContentAliases.xml is the reference for file types and DynamicContentAliases.xml is the reference for Java types. HostAliases provides an alias including port number, if any, for each machine name. Configuration of an alias on a per machine name basis is useful when directing resources to a specific server for load balancing purposes. HostAliases also provides a default host name.

Figure 7:
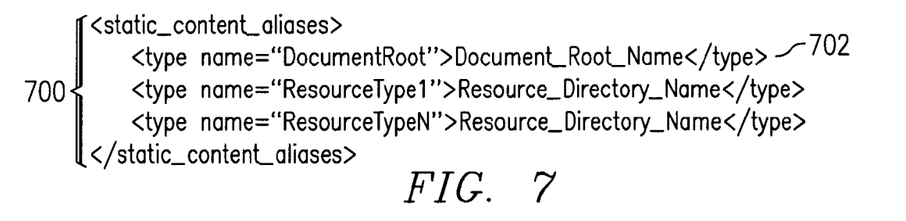
FIG. 7 is a diagram illustrating a static content aliases XML file in accordance with a preferred embodiment of the present invention.

Turning next to FIG. 7, a diagram illustrating a static content aliases XML file is depicted in accordance with a preferred embodiment of the present invention. StaticContentAliases.xml 700 is an example of an XML file that may be found in XML files 432 in FIG. 4.

StaticContentAliases.xml 700 contains information about the static content naming. Each element in this XML file has a name attribute. The name attribute specifies a category of static content. The attribute DocumentRoot in line 702 in this example specifies the document root of the static content. The ResourceTypeX attributes specify the content directory names. Some examples are HTML, Java script and media.

Figure 8:
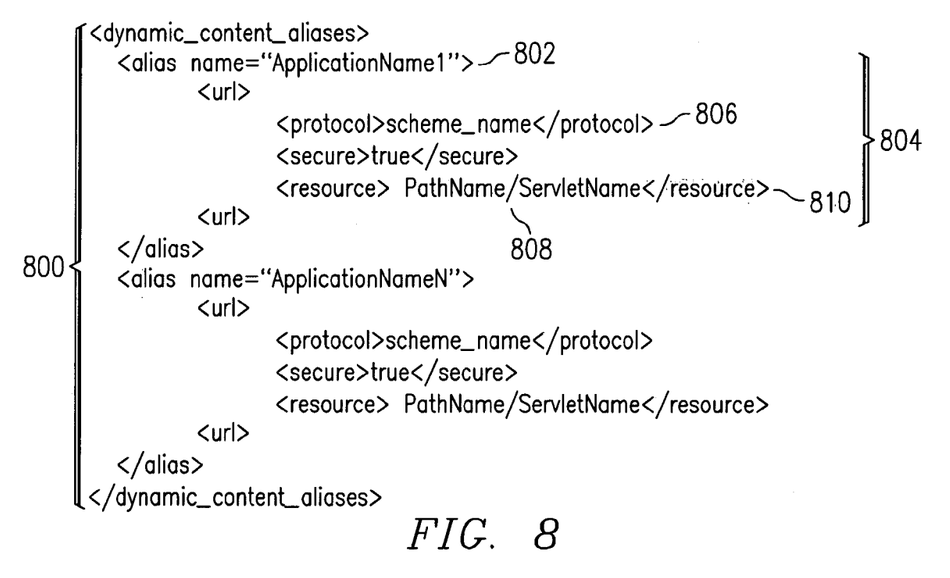
FIG. 8 is a diagram illustrating a dynamic content aliases XML file in accordance with a preferred embodiment of the present invention.

With reference now to FIG. 8, a diagram illustrating a dynamic content aliases XML file is depicted in accordance with a preferred embodiment of the present invention. DynamicContentAliases.xml 800 is an example of an XML file that may be found in XML files 432 in FIG. 4.

DynamicContentAliases.xml 800 contains information about specific components of URLs that access dynamic content. In these examples, all lookup in DynamicContentAliases 800 is based on the application name. The ApplicationName tag in line 802 is the Web application name in the actual XML file. This application name tag is the target parameter passed to the URL constructor in these examples. An example is BkMainMenu. Protocol, security, and resource information in section 804 is associated with the application named in line 802. The protocol tag in line 806 contains the protocol name. In this environment the protocol will most likely be HTTP. However, the grammar allows for use of other protocol names, such as file transfer protocol (FTP) and mailto. The secure tag in line 808 indicates whether security is used. The resource tag in line 810 contains the full resource name including path. Typically this is the name of the servlet or JSP. In the BkMainMenu example the resource is gas bank/BkMainMenu.

Figure 9:
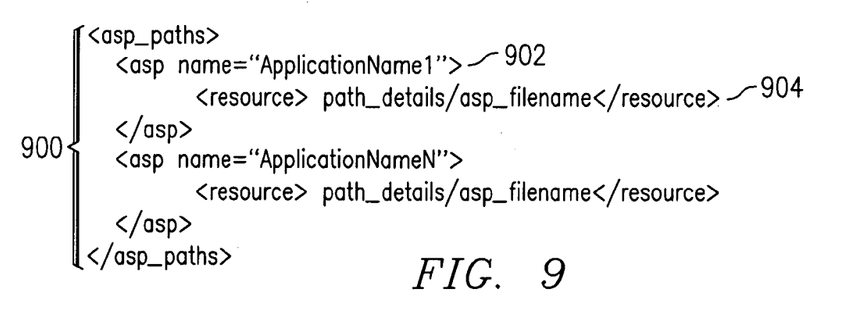
FIG. 9 is a diagram illustrating an ASP paths XML file in accordance with a preferred embodiment of the present invention.

Turning next to FIG. 9, a diagram illustrating an ASP paths XML file is depicted in accordance with a preferred embodiment of the present invention. AspPaths.xml 900 is an example of an XML file that may be found in XML files 432 in FIG. 4.

AspPaths.xml 900 contains the information needed to construct the path to an ASP. The application name found in line 902 is the name parameter passed to the URL constructor for use in searching AspPaths.xml 900. This file name and the path in line 904 is retrieved on lookup of the name attribute in the ASP element. AspPaths.xml 900 is a particular XML file used for ASPs. Other types of files may be used to handle other types of components. For example, DynamicContentAliases.xml is used to construct the path to a JSP or servlet. HostAliases.xml is used to retrieve the host and port. AspPaths.xml is used to construct the path to an ASP. An entry in HostAliases.xml or another xml configuration file is used to retrieve the host and port for the ASPs. The ASP host is uniquely identified by the xml element. For example, the element IIS-Server may be used to contain the protocol, host and port for ASPS.

Figure 10:
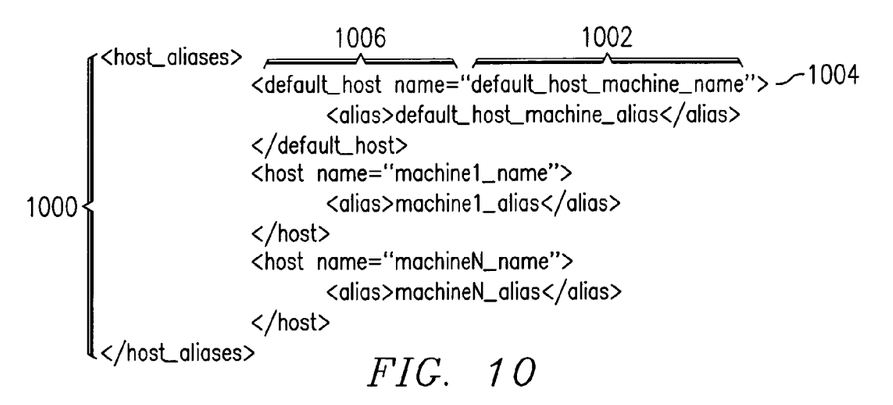
FIG. 10 is a diagram illustrating a host aliases XML file in accordance with a preferred embodiment of the present invention.

With reference now to FIG. 10, a diagram illustrating a host aliases XML file is depicted in accordance with a preferred embodiment of the present invention. HostAliases.xml 1000 is an example of an XML file that may be found in XML files 432 in FIG. 4.

HostAliases.xml 1000 contains the information needed for the full host name, machine name and port number. Default host name 1002 including port number in line 1004 is retrieved on lookup of the element default_host, default_host name 1006. The other entries in the HostAliases file provide the alias for a given machine. The repeating tag host encloses the alias tag which provides the full host alias name for a given machine name.

Figure 11:
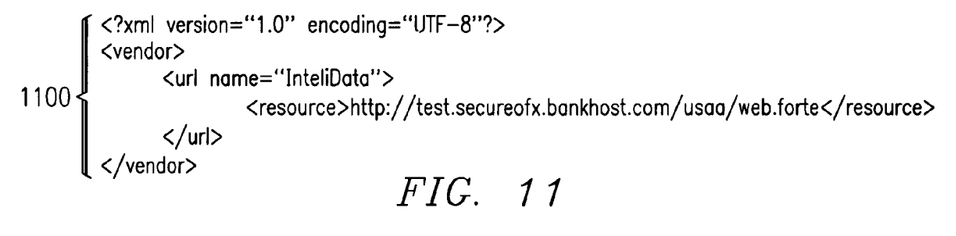
FIG. 11 is a diagram illustrating an external path XML file in accordance with a preferred embodiment of the present invention.

Turning next to FIG. 11, a diagram illustrating an external path XML file is depicted in accordance with a preferred embodiment of the present invention. ExternalPaths.xml 1100 is an example of a file used to identify a path to an external resource. The external resource is typically one provided by a third party or a vendor. In this example, each URL tag in ExternalPaths.xml 1100 contains a resource tag which includes the complete URL for a third party or vendor. The vendor name, in these examples, is passed as a target parameter to the URL constructor. This target parameter is used as a lookup in ExternalPaths.xml 1100 to search for a match with the name attribute of a URL tag.

The different XML files illustrated in FIGS. 7–11 are provided for purposes of illustration and are not meant to limit the manner in which configuration and encoding information used to generate URLs for a Web page or redirection is stored. Other formats or other types of files may be used depending on the particular parameters used in generating a link, such as a URL.

Thus, the present invention provides an improved method, apparatus, and computer instructions for generating links in documents, such as Web pages. The mechanism provides for the dynamic generation of links from a base link or URL, which is a set of parameters that are used to generate a link or URL for the Web page or redirection. In this manner, changes, such as changes in the location of resources do not require a programmer or developer to make changes to each and every document. Instead, these changes may be made to a configuration file, such as XML files 432 in FIG. 4.

Consequently, the present invention reduces the amount of time and reduces the need for a content developer to understand the details of a link for a Web page. In this manner, specific configuration, paths, resources, and servers do not have to be specified by a developer or programmer. This information is placed in a configuration file and the links are generated at runtime using this file. As a result, content may be developed and executed independently of the runtime environment on which the content executes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the illustrated embodiments are directed towards HTML pages, the mechanism of the present invention may be applied to other types of content. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating links, the method comprising:
   detecting generation of a page containing a link to a target; and
   generating the link using parameters associated with the target.

2. The method of claim 1, wherein the parameters include at least one of protocol, a security for the protocol, a path to the target, a host name, and a resource.

3. The method of claim 1, wherein the page is a Web page.

4. The method of claim 3, wherein the Web page is a Java server page.

5. The method of claim 3, wherein the Web page is art active server page.

6. The method of claim 1, wherein the link is a universal resource locator.

7. The method of claim 1, wherein the detecting step comprises:
   receiving a call to generate the link to the target, wherein the parameters are received in the call.

8. The method of claim 7, wherein the parameters include at least one of a host, a type, the target, and a file.

9. The method of claim 7, wherein the call is received from an application server.

10. A method in a data processing system for generating universal resource locators, the method comprising:
    generating a Web page; and
    responsive to detecting a requirement for a universal resource locator for the Web page during creation of the Web page, creating the universal, resource locator using encoding information associated with the Web page.

11. The method of claim 10, wherein the encoding information is stored in an extensible markup language file.

12. The method of claim 10, wherein the encoding information includes at least one of a protocol, a security for the protocol, a path, a host name, and a resource.

13. The method of claim 10, wherein the creating step is performed in a universal resource locator constructor.

14. The method of claim 10, wherein the requirement is a base universal resource locator.

15. A data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to detect generation of a page containing a link to a target and generate the link using parameters associated with the target.

16. A data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to generate a Web page and create the universal resource locator using encoding information associated with the Web page in response to detecting a requirement for a universal resource locator for the Web page during creation of the Web page.

17. A data processing system for generating links, the data processing system comprising:
    detecting means for detecting generation of a page containing a link to a target; and
    generating means for generating die link using parameters associated with the target.

18. The data processing system of claim 17, wherein the parameters include at least one of protocol, a security for the protocol, a path to the target, a host name, and a resource.

19. The data processing system of claim 17, wherein the page is a Web page.

20. The data processing system of claim 19, wherein the Web page is a Java server page.

21. The data processing system of claim 19, wherein the Web page is an active server page.

22. The data processing system of claim 17, wherein the link is a universal resource locator.

23. The data processing system of claim 17, wherein the detecting means comprises:
    receiving means for receiving a call to generate the link to tbe target, wherein the parameters are received in the call.

24. The data processing system of claim 23, wherein the parameters include at least one of a host, a type, the target, and a file.

25. The data processing system of claim 23, wherein the call is received from an application server.

26. A data processing system for generating universal resource locators, the data processing system comprising:
    generating means for generating a Web page; and
    creating means, responsive to detecting a requirement for a universal resource locator for the Web page during creation of the Web page, for creating the universal resource locator using encoding information associated with the Web page.

27. The data processing system of claim 26, wherein the encoding information is storod in an extensible markup language file.

28. The data processing system of claim 26, wherein the encoding information includes at least one of a protocol, a security for the protocol, a path, a host name, and a resource.

29. The data processing system of claim 26, wherein the creating step is performed in a universal resource locator constructor.

30. The data processing system of claim 26, wherein the requirement is a base universal resource locator.

31. A computer program product in a computer readable medium for generating links, the computer program product comprising:
    first instructions for detecting generation of a page containing a link to a target; and
    second instructions for generating the link using parameters associated with the target.

32. A computer program product in a computer readable medium for generating universal resource locators, the computer program product comprising:
    first instructions for generating a Web page; and
    second instructions, responsive to detecting a requirement for a universal resource locator for the Web page during creation of the Web page, for creating the universal resource locator using encoding infonnation associated with the Web page.

* * * * *